United States Patent [19]

Tanaka et al.

[11] Patent Number: 4,750,584

[45] Date of Patent: Jun. 14, 1988

[54] DISTANCE MEASURING DEVICE

[75] Inventors: Hiroaki Tanaka, Nukata; Shigeyuki Akita, Okazaki; Hideki Kashiwagi, Nishio, all of Japan

[73] Assignee: Nippon Soken, Inc., Nishio, Japan

[21] Appl. No.: 819,858

[22] Filed: Jan. 17, 1986

[30] Foreign Application Priority Data

Jan. 18, 1985 [JP] Japan .................................. 60-8053

[51] Int. Cl.$^4$ .......................... G01S 9/68; G01S 1/72; G01S 15/00

[52] U.S. Cl. .................................. 181/123; 367/117; 367/140; 367/901; 367/99; 340/58

[58] Field of Search ............... 181/123, 124; 340/901, 340/902, 903, 904, 943, 58; 342/123, 118, 120, 121, 127, 134, 135, 136, 137, 145, 42, 47, 69, 70, 71, 72; 367/91, 96, 99, 97, 100, 106, 117, 908, 909, 140, 87, 105, 901, 903, 910; 73/146.2

[56] References Cited

U.S. PATENT DOCUMENTS

| 4,225,950 | 9/1980 | Kotera et al. | 342/70 X |
| 4,240,152 | 12/1980 | Duncan et al. | 367/909 X |
| 4,400,803 | 8/1983 | Spiess et al. | 367/106 X |
| 4,604,733 | 8/1986 | Brown et al. | 367/2 |

Primary Examiner—Deborah L. Kyle
Assistant Examiner—Brian S. Steinberger
Attorney, Agent, or Firm—Cushman, Darby & Cushman

[57] ABSTRACT

A distance detecting device having a transmitter for intermittently transmitting measuring waves toward an object, a pair of receivers provided so as to be spaced from each other by half the wave length of the waves in a direction of the object, each receiver receiving reflected waves from the object and transmitting a reception signal responsive to the amplitude of the reflected waves, an addition circuit for adding the reception signal from each of the pair of receivers and transmitting an addition signal, a peak detection circuit for detecting a peak of the addition signal and transmitting a reflected waves reach signal at the time of peak detection, and an operation device for calculating the distance to the object based on the return time from the time when the waves are transmitted to the time when the reflected waves reach signal is outputted.

7 Claims, 4 Drawing Sheets

DISTANCE MEASURING DEVICE

BACKGROUND OF THE INVENTION

The present invention relates to a distance measuring device, especially a device for intermittently transmitting ultrasonic waves or electric waves toward an object, measuring the time required until the transmitted ultrasonic waves or electric waves return to the device after being reflected on the object, and detecting the distance to the object from the measured time.

The present inventors previously have proposed a device for simply and certainly detecting a peak value of even the reflected waves formed like a series of smooth mountains due to damping or the like which occurs while they are being transmitted, and for measuring the distance based on the time required until a peak value of the reflected waves is detected (Japanese Unexamined Patent Publication No. Sho 60-46478). This device enables the measurement of the distance to the object, which is not affected by the hardness of the object, or the temperature and humidity of the transmission medium.

The present inventors have employed the above-described device for detecting the air pressure of tires as shown in FIGS. 5 and 6. In FIGS. 5 and 6, the drop of the air pressure of a tire W is detected by measuring the distance h between an axle A and a road surface E. An ultrasonic distance detector 1 is provided on the axle A and comprises an ultrasonic transmitter and an ultrasonic receiver (not shown), each facing the road surface E. The ultrasonic distance detector 1 further comprises a circuit for detecting a peak value of a reception signal of the ultrasonic receiver and for transmitting a reflected waves reaching signal.

The ultrasonic distance detector 1 also is connected to an operation device 2. The operation device 2 measures the time t needed from the time when the ultrasonic waves are transmitted until the reflected waves reaching signal is received by the ultrasonic distance detector 1, calculates the distance h to the road surface E based on the measured time t and gives an air pressure drop alarm when the distance h becomes smaller than a predetermined value.

However, a large number of experimental results show that the air pressure drop alarm is sometimes erroneously given although the air pressure of the tire is sufficiently high. This is caused by the fact that the time t varies not linearly in proportion to the distance h but periodically at distances of $\lambda$ as shown by the line y in FIG. 4. This periodical variation of the time t seems to result from the interference between waves reflected on the object. In this case the distance $\lambda$ is equal to the wave length of waves such as ultrasonic waves used in this device.

SUMMARY OF THE INVENTION

One object of the present invention is to provide a distance measuring device which transmits waves toward an object and calculates the distance to the object from a return time required until the waves return after being reflected on the object.

Another object of the present invention is to provide a distance measuring device which calculates the distance to the object from a return time needed from the time when waves are transmitted until peaks of the reflected waves return to the device.

Still another object of the present invention is to provide a distance measuring device which accurately calculates the distance to the object, cancelling the variation of the return time due to the interference between the reflected waves.

The distance measuring device according to the present invention comprises transmission means for transmitting measuring waves, each having a constant frequency, toward an object intermittently, a pair of reception means provided so as to be spaced from each other in a direction of the object by a predetermined distance which is an odd multiple of half the wave length of the measuring waves, each of the reception means receiving reflected waves of the measuring waves on the object and outputting a reception signal responsive to an amplitude of the received reflected waves, addition means for adding reception signals from the reception means to each other and transmitting an addition signal having vibration periods, peak detection means for detecting a peak of the addition signal and transmitting a reflected wave reach signal at the time of peak detection, and operation means for calculating the distance to the object based on a return time from the time when the measuring waves are transmitted to the time when the reflected waves reach signal is outputted.

According to the distance measuring device having the above-described construction, the return time varies not periodically but linearly in proportion to the distance to the object. Therefore, the distance to the object can be accurately detected from the return time.

DETAILED DESCRIPTION OF THE EMBODIMENT

Figure 1:
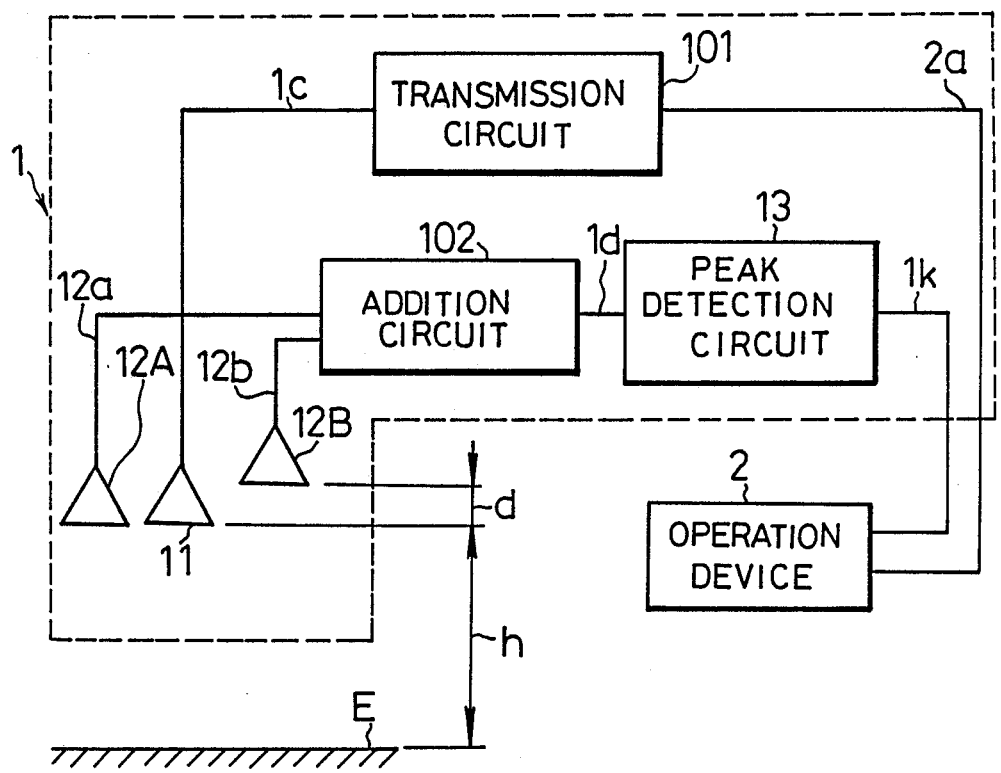
FIG. 1 is a block diagram of an ultrasonic distance detector in accordance with the present invention.
Figure 5:
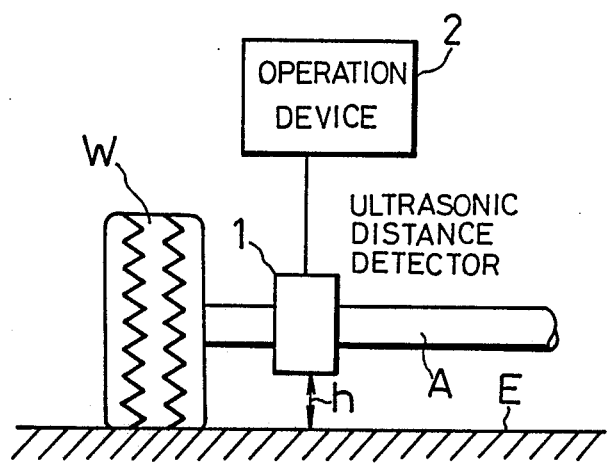
FIGS. 5 and 6 are a front view and a side view respectively of an axle of a vehicle provided with an air pressure drop detecting device.
Figure 6:
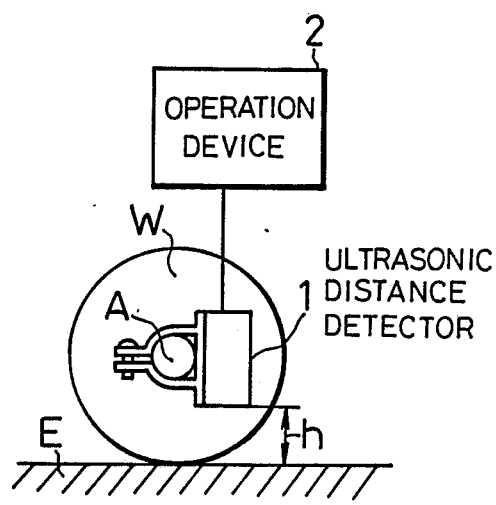

FIG. 1 is a block diagram of an ultrasonic distance detector 1 shown in FIG. 5. The ultrasonic distance detector 1 is provided with one ultrasonic transmitter 11 and two ultrasonic receivers 12A and 12B, each facing a road surface E. Both of the ultrasonic transmitter 11 and the ultrasonic receiver 12A are opposed to the road surface E at the same distance h. The ultrasonic receiver 12B is located above the receiver 12A so as to be spaced therefrom by a predetermined distance d. In this case, the distance d is set to $\lambda/2$, wherein $\lambda$ is the wave length of the used ultrasonic waves.

The transmitter 11 is connected to a transmission circuit 101. The transmission circuit 101 receives a transmission command signal 2a from an operation device 2 and transmits an excitation signal 1c to the transmitter 11. The ultrasonic waves from the transmitter 11 are reflected on the road surface E and return to the receiver 12A. A little later, the reflected waves also reach the receiver 12B. Then, the receivers 12A and 12B output signals 12a and 12b, respectively, each being respective to the amplitude of the received reflected ultrasonic waves.

The signals 12a and 12b are added to each other in an addition circuit 102 to obtain an addition signal 1d. This addition signal 1d is fed to a peak detection circuit 13 which detects the peak of the detection signal 1d and outputs a reflected wave reach signal 1k at the time of peak detection.

The operation device 2 calculates the distance h to the road surface E based on the time t needed from the time when the ultrasonic waves are transmitted until the reflected wave reach signal 1k is outputted, and operation device 2 emits an air pressure drop alarm when the distance h becomes smaller than a predetermined value.

Figure 2:
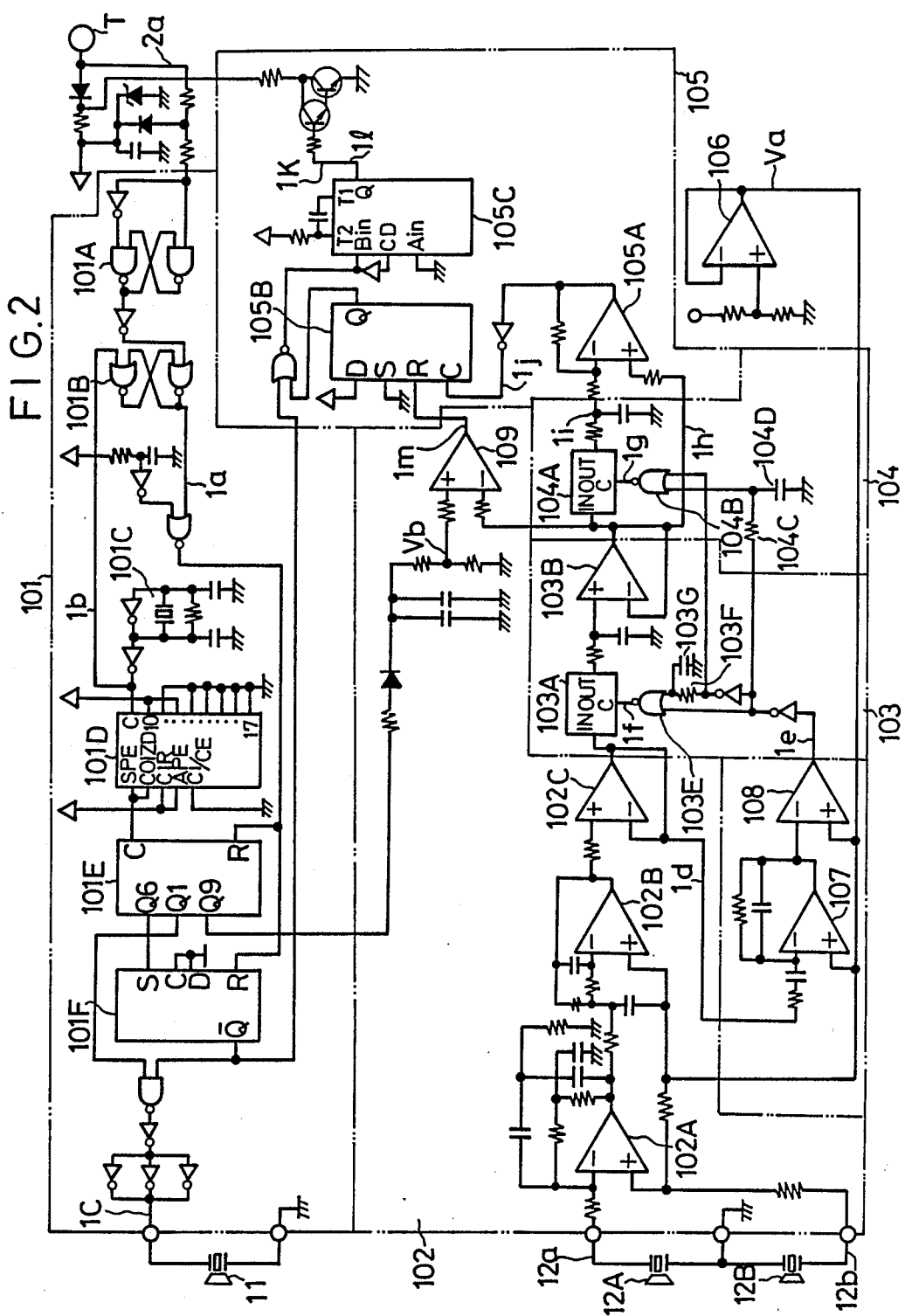
FIG. 2 is a circuit diagram of the ultrasonic distance detector of FIG. 1.

FIG. 2 is a circuit diagram of the ultrasonic distance detector of FIG. 1. As shown in FIG. 2, the peak detection circuit 13 is composed of a first sample-and-hold circuit 103, a second sample-and-hold circuit 104, a comparison circuit 105 and the like. As also shown, receivers 12A and 12B are connected to a differential amplifier 102A composing the addition circuit 102 and acting also as an active filter. The differential amplifier 102A adds the signals 12a and 12b from the receivers 12A and 12B to each other.

Figure 3:
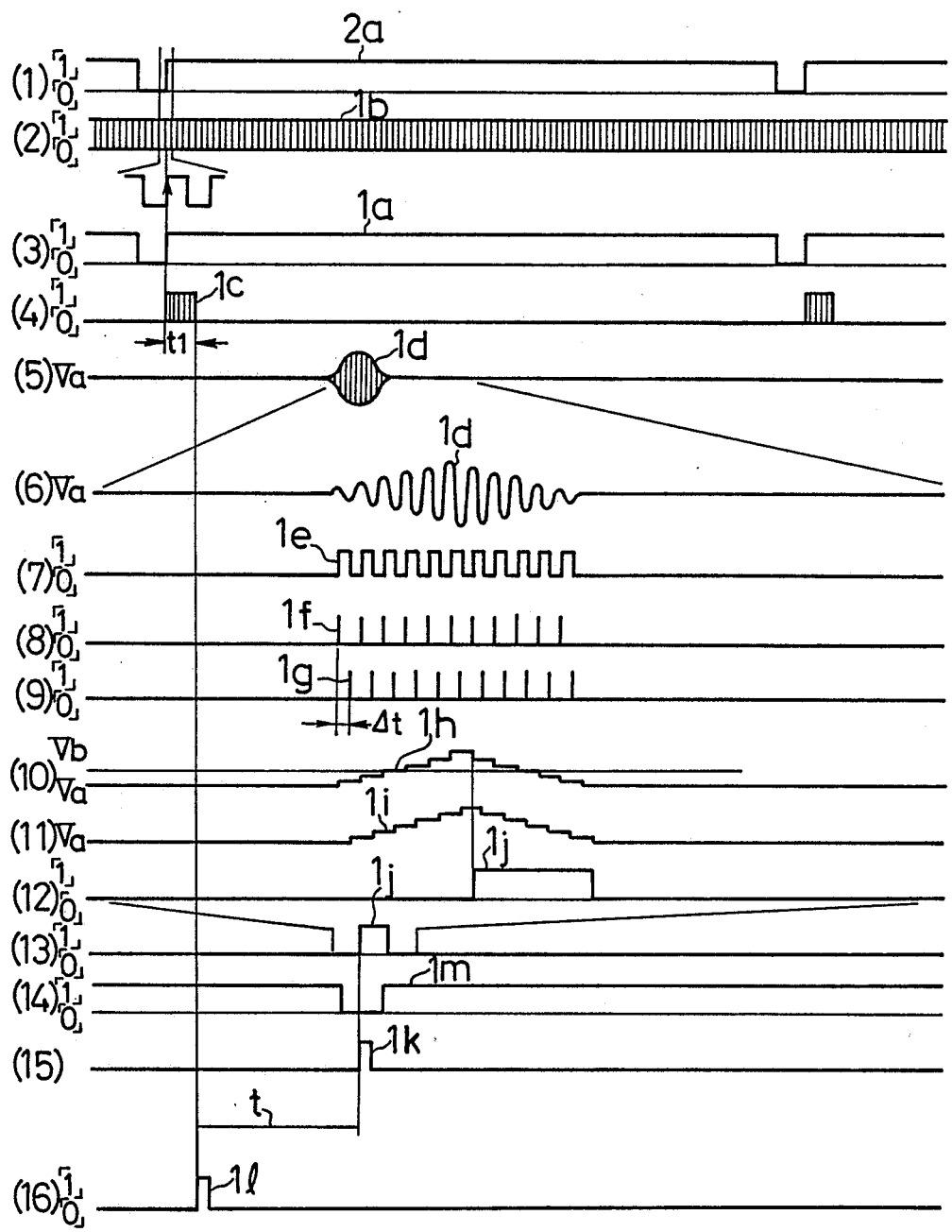
FIG. 3 is a signal waveform chart for the circuit of FIG. 2.

Hereinafter, the operation of the above described circuits will be explained with reference to the time chart of FIG. 3. In FIG. 3, fine lines indicate the expansion or the contraction of the axis of time.

In FIG. 2, the transmission command signal 2a (FIG. 3(1)) transmitted from the operation device 2 (FIG. 1) through a terminal T is turned into a transmission timing signal 1a (FIG. 3(3)) by way of fip-flops 101A and 101B, each being composed of gates. The timing signal 1a rises synchronously with the standard pulse 1b (FIG. 3(2)) outputted from an oscillation circuit 101C. The standard pulse 1b is divided by counters 101D and 101E to obtain a transmitter excitation signal 1c (FIG. 3(4)) having a predetermined frequency. This transmitter excitation signal 1c is fed to the transmitter 11 synchronously with the rising of the signal 1a. This transmitter excitation signal 1c is intermittently outputted for a constant time $t_1$ until a terminal $\overline{Q}$ of a D type flip-flop 101F is inverted. When the terminal $\overline{Q}$ is inverted, a transmission confirmation signal 11 (FIG. 3(16)) is outputted from a monostable multivibrator 105C, composing the comparison circuit 105, to the operation device 2 through the terminal T.

When ultrasonic waves from the transmitter 11 are reflected on the road surface E (FIG. 1) and enter into the receivers 12A and 12B, the reception signals 12a and 12b are added to each other by the amplifier 102A, and inputted to an amplifier 102C through the amplifier 102B to be 'impedance-converted (signal 1d (FIG. 3(5),(6)). The standard level of the addition signal 1d is a constant voltage Va outputted from an amplifier 106.

The addition signal 1d is inputted to an analog switch 103A composing the first sample-and-hold circuit 103. The addition signal 1d is also inputted to an amplifier 107 composing a differentiator and is shaped in an amplifier 108. As a result, a rectangular pulse signal 1e (FIG. 3(7) is produced having a predetermined pulse width Δt, which is turned to '1- level in every vibration period of the signal 1d.

A gate 103E responsive to pulse signal 1e outputs a sample signal 1f (FIG. 3(8)) having a pulse width determined by a resistor 103F and a condenser 103G, synchronously with the rising of the signal 1e. A gate 104B composing the second sample-and-hold circuit 104 outputs a sample signal 1g (FIG. 3(9)) having a pulse width determined by a resistor 104C and a condenser 104D synchronously with the falling of the signal 1e.

The analog switch 103A conducts at every time when the sample signal 1f is inputted to a terminal C thereof. This results in the peak values of the addition signal 1d in vibration periods thereof being successively held and outputted from an amplifier 103B as a first hold signal 1h (FIG. 3(10)). The first hold signal 1h is sampled again by an analog swich 104A operated by a sample signal 1g outputted after lapse of a constant time Δt from the outputting time of the sample signal 1f and is held as a second hold signal 1i (FIG. 3(11). The first hold signal 1h and the second hold signal 1i then are compared with each other by a comparator 105A composing the comparison circuit 105, which outputs a peak detection signal 1j (FIG. 3(12), (13)) which turns to '1- level when the second hold signal 1i becomes larger than the first hold signal 1h.

Upon receiving the peak detection signal 1j, a D type flip-flop 105B is set, and the reflected wave reach signal 1k (FIG. 3(15)) having a predetermined pulse width is outputted from the monostable multivibrator 105C to the operation device 2 through the terminal T. In fact, the peak detection signal 1j is outputted in the vibration period next to that wherein the reception signal 1d actually has a peak value. However, since the vibration period of the ultrasonic waves is very short and constant, the above-described fact does not incur any practical problems.

A comparator 109 also compares the first hold signal 1h with a constant voltage Vb obtained by rectifying and smoothing an output of a terminal Q9 of counter 101E. When the first hold signal 1h is not larger than the constant voltage Vb, a signal 1m (FIG. 3(14)) inhibits the flip-flop 105B from being set and accordingly, the reflected wave reach signal 1k is not outputted.

The operation device 2 calculates the distance h to the road surface E based on the return time t needed from the time when the ultrasonic waves confirmation signal 1l is received to the time when the reflected waves reach signal 1k is received.

In this embodiment, in order to cancel error due to the ups and downs of the road surface E, a large number such as ten thousand calculations are performed, and the obtained calculation results are averaged to obtain the distance h between the detector 1 and the road surface E.

Figure 4:
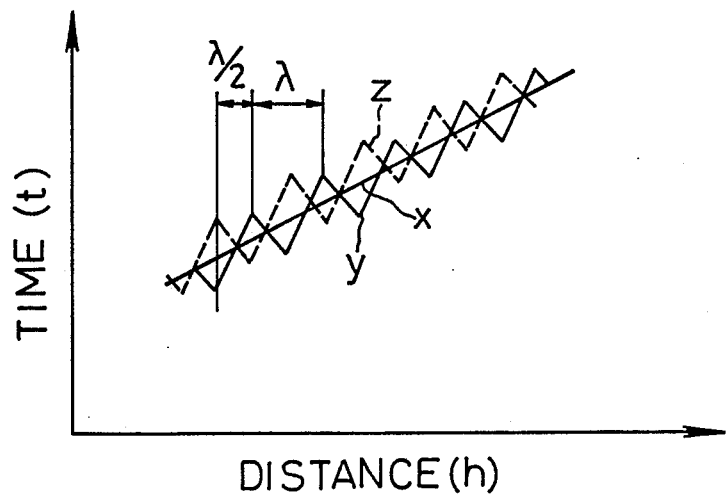
FIG. 4 is a view showing the relation between a return time of reflected waves and the distance to an object.

The measured return time to so detected linearly varies relative to the obtained distance h to the road surface E as shown by the line x of FIG. 4. In FIG. 4, the line y indicates the variation of the return time of the receiver 12A, and the line z indicates the variation of the return time of the receiver 12B located above the receiver 12A to the road surface E by λ/2.

By adding the return times of the receivers 12A and 12B to each other, the fluctuation thereof is cancelled by each other to obtain the return time t varying in linear proportion to the distance h as shown by the line x. An accurate distance h can be detected from this return time t.

As described above, in the present embodiment, the return time t is detected based on the addition signal 1d obtained by adding the reception signals 12a and 12b to each other. Instead, by measuring the return times of the receivers 12A and 12B, respectively, and adding the measured return times to each other, the same result can be obtained. But, the former method of the present embodiment is more practical than the latter method.

The device of the present invention can be employed for measuring various distances other than detecting the air pressure drop of tires. In such cases, electric waves can be employed in place of ultrasonic waves. Furthermore, a structure such as transmitter 11 also acting as one of the receivers 12A and 12B will do. In this case, after ultrasonic waves are transmitted, the connection of the transmitter 11 must be changed from the transmission circuit 101 to the addition circuit 102.

The distance between the receivers 12A and 12B is not limited to half of the wave length of the measuring waves ($\lambda/2$). Any odd multiples of half of the wave length of the measuring waves will do.

What is claimed is:

1. A distance measuring device comprising:
   transmission means for intermittently transmitting measuring waves of constant frequency toward an object;
   a pair of reception means spaced from each other in the direction of the object by a predetermined distance which is an odd integral multiple of half the wave length of the measuring waves, each reception means of said pair of reception means receiving reflected waves of the measuring waves from the object and outputting a reception signal responsive to an amplitude of the received reflected waves;
   addition means for adding reception signals from said pair of reception means to each other so as to substantially cancel interference in said received reflected waves and for transmitting an addition signal having vibration periods;
   peak detection means for detecting a peak of the addition signal and transmitting a reflected waves reach signal at the time of peak detection; and
   operation means for calculating the distance to the object based on a measuring wave propagation return time needed from the time when the measuring waves are transmitted to the time when the reflected waves reach signal is outputted.

2. A distance measuring device according to claim 1, wherein said transmission means has an ultrasonic transmitter and said pair of reception means comprises ultrasonic receivers.

3. A distance measuring device according to claim 2, wherein said addition means has a differential amplifier and said ultrasonic receivers are connected to a pair of input terminals of said differential amplifier.

4. A distance measuring device according to claim 1, wherein said peak detection means has delay means for delaying the addition signal by a predetermined time and comparison means for comparing the addition signal with the delayed addition signal and transmitting the reflected waves reach signal when the signal level of the addition signal becomes less than that of the delayed addition signal.

5. A distance measuring device according to claim 4, wherein said delay means has a first sample-and-hold circuit which operates in every vibration period of the addition signal to sample and hold the addition signal, a second sample-and-hold circuit which operates after the operation of said first sample-and-hold circuit by the predetermined delay time to sample and hold an output signal of said first sample-and-hold circuit, and said comparison means has a comparison circuit which compares the output signal of said first sample-and-hold circuit with an output signal of said second sample-and-hold circuit and transmits the reflected waves reach signal when the signal level of the output signal of said first sample-and-hold circuit becomes less than that of the output signal of said second sample-and-hold circuit.

6. A distance measuring device according to claim 1, wherein said transmission means and said pair of reception means are installed on an under surface of an axle of a vehicle so as to face a road surface, and said pair of reception means are spaced from each other in a vertical direction by said predetermined distance.

7. A distance measuring device comprising:
   transmission means for intermittently transmitting measuring waves of constant frequency toward and object;
   a pair of reception means spaced from each other in a direction of the object by a predetermined distance which is an odd integral multiple of half the wave length of the measuring waves, each reception means of said pair of reception means receiving reflected waves of the measuring waves from the object and outputting a reception signal responsive to an amplitude of the received reflected waves;
   a pair of peak detection means, each detection means of said pair detecting a peak of the reception signal outputted by each of said pair of reception means and transmitting a reflected waves reach signal at the time of peak detection;
   a pair of return time operation means, each calculating a measuring wave propagation return time taken from the time when the measuring waves are transmitted by said transmission means to the time when the reflected waves reach signal is outputted;
   addition means for adding the return times calculated by each of said pair of return time operation means to each other; and
   distance operation means for calculating the distance to the object based on the added return times.

* * * * *